United States Patent [19]

Yasso

[11] Patent Number: 5,441,099
[45] Date of Patent: Aug. 15, 1995

[54] METHOD AND APPARATUS FOR FORCIBLY COOLING COMPONENTS OF AN AUTOMOTIVE VEHICLE PRIOR TO EMISSION TESING

[75] Inventor: Adel K. Yasso, Grand Blanc, Mich.

[73] Assignee: Ford Motor Company, Dearborn, Mich.

[21] Appl. No.: 110,236

[22] Filed: Aug. 23, 1993

[51] Int. Cl.⁶ .................................. F28D 1/00
[52] U.S. Cl. ...................... 165/41; 123/41.31
[58] Field of Search ............. 165/41, 96, 100, 101, 165/139; 123/41.31, 41.09, 41.10, 41.11, 41.12, 41.48, 41.49, 41.51

[56] References Cited

U.S. PATENT DOCUMENTS

| | | |
|---|---|---|
| 2,670,933 | 3/1954 | Bay . |
| 3,863,612 | 4/1975 | Wiener . |
| 4,362,131 | 12/1982 | Mason et al. . |
| 4,535,729 | 8/1985 | Taylor . |
| 4,924,818 | 5/1990 | Linden . |
| 5,046,550 | 9/1991 | Boll ........................................ 165/41 |
| 5,105,875 | 4/1992 | McArthur ............................ 165/41 |
| 5,188,390 | 2/1993 | Clark . |
| 5,201,285 | 4/1993 | McTaggart ...................... 123/41.31 |
| 5,207,186 | 5/1993 | Okita ................................ 123/41.31 |
| 5,234,051 | 8/1993 | Weizenburger ...................... 165/41 |
| 5,261,356 | 11/1993 | Takahashi ....................... 123/41.31 |
| 5,275,133 | 1/1994 | Sasaki ............................. 123/41.31 |

Primary Examiner—James C. Yeung
Assistant Examiner—Daniel J. O'Connor
Attorney, Agent, or Firm—Kevin G. Mierzwa; Roger L. May

[57] ABSTRACT

An apparatus for forcibly cooling selected components of a vehicle includes a heat exchanger separate from the engine, a pump for circulating the engine oil and engine coolant between the engine and the heat exchanger at a predetermined flow rate, and a variable valve for controlling the flow rate between the engine and heat exchanger. A blower forces and directs air at the components. A controller connected to a thermocouple controls the operation of the blower, pump and a variable valve. The components are cooled in a controlled manner.

8 Claims, 4 Drawing Sheets

METHOD AND APPARATUS FOR FORCIBLY COOLING COMPONENTS OF AN AUTOMOTIVE VEHICLE PRIOR TO EMISSION TESING

BACKGROUND OF THE INVENTION

The invention relates generally to emission testing of an automotive vehicle and more specifically to cooling selected components of an automotive vehicle to a predetermined temperature prior to the testing of an automotive vehicle.

Exhaust gas emission tests of motor vehicles, if not performed in a controlled manner, can cause varying results. Some of the factors causing variability include the temperature of the exhaust system, particularly the catalyst, the engine block temperature including the fluids contained therein, the transmission and the ambient temperature of the environment in which the vehicle is tested. During the development cycle of the vehicle, several tests are performed. Currently, vehicles are soaked for 12 hours in a temperature controlled environment between each exhaust gas emission test to ensure that the temperature of the critical components has stabilized.

Generally, the engine is the most massive structure of the automotive vehicle and the engine block and the fluids contained therein take a significant amount of time to cool naturally. The engine contains oil and coolant which is typically a 50-50 mixture of ethylene glycol and water. An engine cannot be cooled too fast from the inside or outside because condensation may form on the cylinder walls. Condensation on the cylinder walls can adversely effect exhaust gas emissions data.

SUMMARY OF THE INVENTION

It is therefore an object of the invention to provide a system for controllably cooling components of a vehicle in a relatively short amount of time while preventing adverse effects in the exhaust gas emissions.

A preferred embodiment of the invention includes a heat exchanger separate from the engine, a pump for circulating the engine oil and engine coolant between the engine and the heat exchanger at a predetermined flow rate, and a variable valve means for controlling the flow rate between the engine and heat exchanger. The invention further includes a blower which forces and directs air at particular components. A controller connected to a thermocouple controls the operation of the blower, pump and a variable valve.

One advantage of the invention is that the time between tests has been significantly reduced resulting in a shortened testing cycle for a vehicle. Since many tests need to be run in the development cycle for a vehicle, the total development time of the vehicle is significantly reduced.

DETAILED DESCRIPTION OF THE PREFERRED EMBODIMENT

Figure 1:
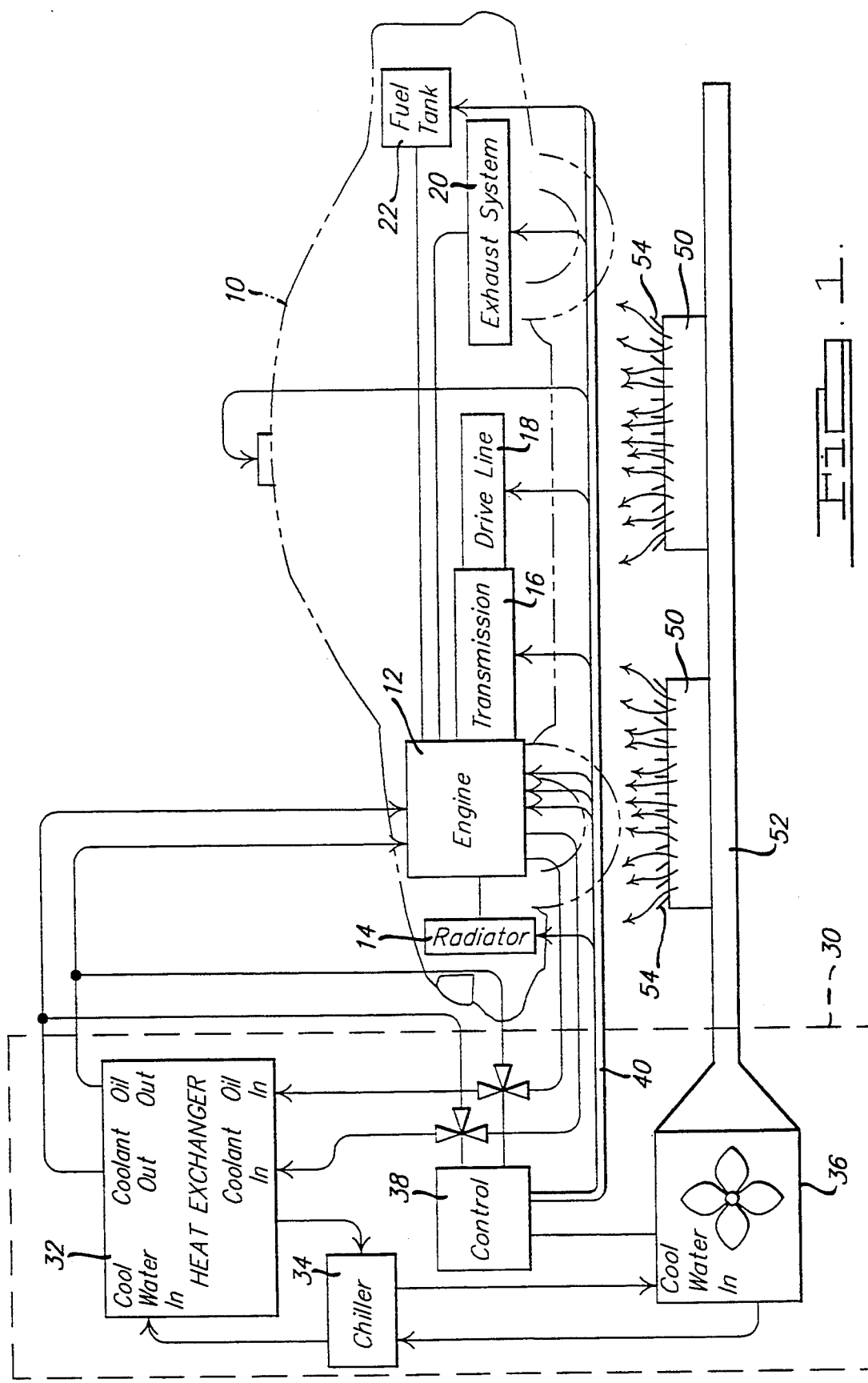
FIG. 1 is a block diagram of the forced cool down apparatus of the present invention.

Referring now to FIG. 1, automotive vehicle 10 includes, inter alia, an engine 12 connected to a radiator 14, a transmission 16, an exhaust system 20, and a fuel tank 22. Transmission 16 is connected to a driveline 18. After the vehicle is run for a period of time, these components are heated to various temperatures. To minimize variability of exhaust gas emissions tests, these components should start at ambient temperature before performing an exhaust gas emission test. Ambient temperature is controlled in the laboratory setting at 75° F. To reduce the temperature of the components, an apparatus 30 force cools the components in a controlled manner. Apparatus 30 includes a heat exchanger 32, a water chiller 34, a blower 36, a control unit 38, and thermocouples 40. Apparatus 30 is preferably contained in a single unit for ease of mobility in a test laboratory situation.

Heat exchanger 32 cools both the engine oil and engine coolant. Heat exchanger 32 preferably comprises a single unit having a capacity to simultaneously cool two separate liquids at once. However, heat exchanger 32 can include two individual units; one for the engine oil and one for engine coolant. Typical maximum operating temperatures for the engine oil and engine coolant from a sufficiently warm engine are 210° F. and 195° F. respectively. The preferred heat capacity for the engine oil heat exchanger is 29000 BTU/hr. The preferred heat capacity for the coolant heat exchanger is 14000 BTU/hr. The capacity can be varied, however, these values were found to be sufficient to cool the fluids at a sufficient rate. Chiller 34 provides cool water to heat exchanger 32 at 35° F.

Engine oil and engine coolant are provided to heat exchanger 32 preferably through supply lines 42 and 44. Quick disconnect valves (shown in FIG. 2) are typically provided on vehicles undergoing preproduction development work so that engine oil and coolant are easily accessible. For example, quick disconnects are provided at the oil pan drain plug for removing oil from the vehicle, as well as at the oil fill cap for replacing oil back into the engine through returns 46 and 48. The fluid path and the various components contained therein will be described in further detail in conjunction with FIG. 2.

A blower means forces and directs cooled air at the heated components of the vehicle. The blower means is comprised of a blower 36, diffuser 50 and flex hose 52. Blower 36 provides 10,000 cubic feet/minute at its output. Blower 36 also is provided with cool water at approximately 35° F. from chiller 34 so the blower can provide chilled air at 48° F. at its output.

The output air from blower 36 is directed at the vehicle components through flexible hose 52 to diffuser 50. Flexible hose 52 should be of a sufficient diameter to accommodate the flow of air from blower 36. For a 10000 cfm blower, a 12 inch diameter hose is preferred. Diffuser 50 can be one unit or several units depending on the size of the vehicle to be tested. An adequate number of diffusers should be provided so air can be directed at the desired components such as the engine and the catalyst of the exhaust system. Typically, two diffusers will be adequate; one being located under the front of the vehicle, and the second being located under the middle of the vehicle. Diffusers 50 have rotatable vanes 54 which are movable so that air can be directed at the desired components.

Blower 36 cools the outside of engine block 12, transmission 16, driveline 18 and exhaust system 20. Radiator 14 and fuel tank 22 may also have air directed at them if their temperatures are excessive. However, these components typically cool quickly and typically do not need forced cooling.

Typically, the exhaust system 20 of the vehicle is connected to an exhaust gas removal system which vents the exhaust fumes from the vehicle in the lab to the external atmosphere. If this system remains connected to the tail pipe during forced cool down, air will be drawn into the engine through an intake valve and drawn through the exhaust system. The air drawn through the system will have a cooling effect on the components in its path.

A control means for controlling the operation of the present invention is provided consisting of a control unit 38 having various inputs and outputs. Control unit 38 is a microprocessor based system such as a Campbell Scientific Datalogger. Control unit 38 has inputs from feedback means such as thermocouples 40 and has outputs which control the operation of the system such as the blower 36 and valves (further described in conjunction with FIG. 2) controlling the flow of engine oil and coolant. Thermocouples 40 are of the commonly known K-type. Thermocouples 40 provide feedback to control unit 38 of the temperature of various components such as engine block 12, transmission 18, exhaust system 20, and fuel tank 22.

Figure 2:
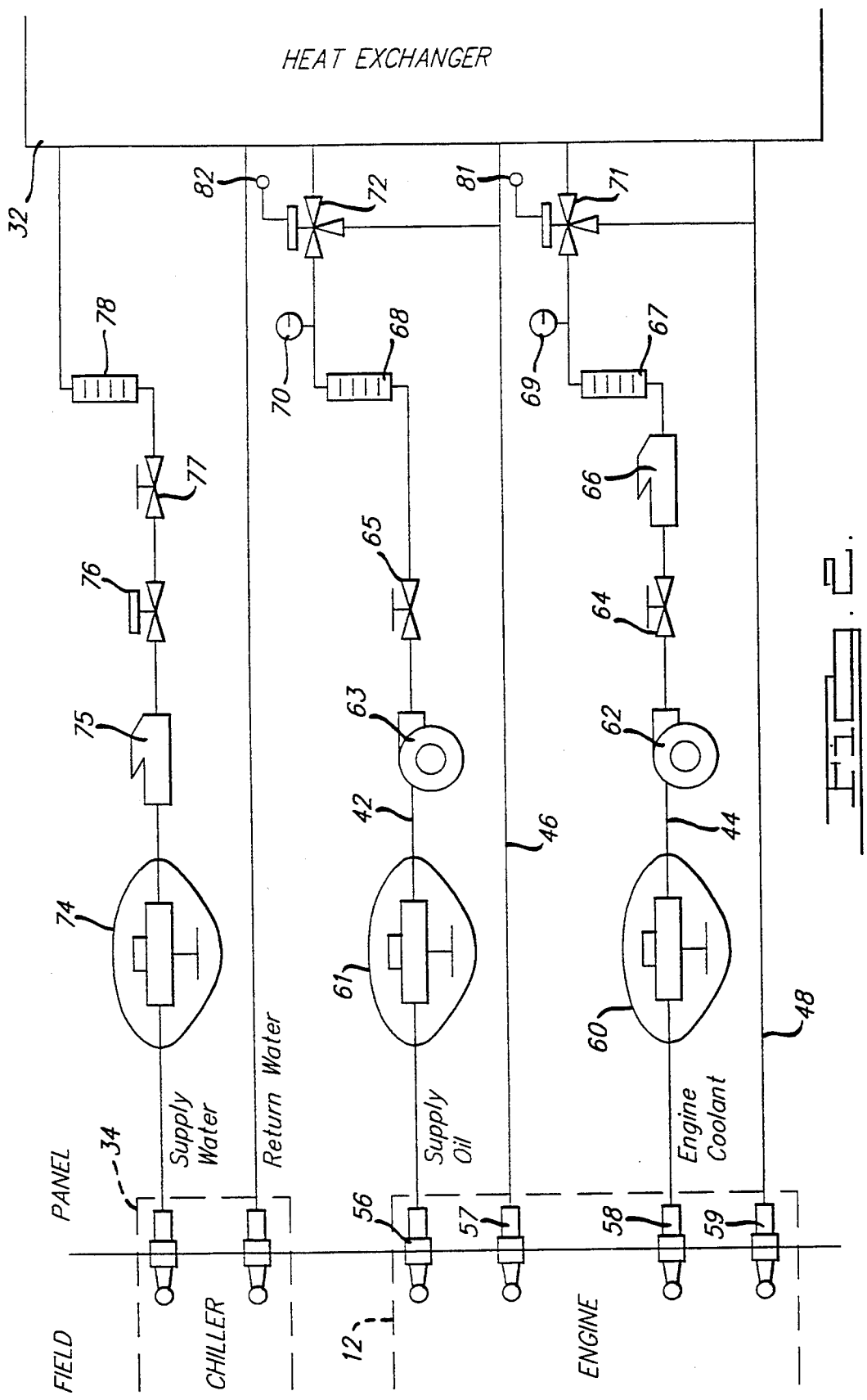
FIG. 2 is a detailed schematic of the fluid communication path to a heat exchanger.

Referring now to FIG. 2, the fluid circuit for both the engine oil and engine coolant are shown. Quick disconnects 56-59 provide easy access for the removal and replacement of the oil and coolant from the engine. Air bleed petcocks 60 and 61 are provided in the highest elevation point in the supply lines 42 and 44 to release unwanted air. Variable speed pumps 62 and 63 in each circuit provide pressure to remove the oil and coolant from the engine and circulate it through heat exchanger 32. The speed of pumps 62 and 63 depends on the fluid capacity of the vehicle. Dampening ball valves 64 and 65 in each circuit smooth the flow of the oil and coolant in the supply lines 42 and 44. A strainer 66 is provided in supply line 44 to filter any foreign particles in the system from entering heat exchanger 32. Particles will clog heat exchanger 32. A strainer is unnecessary in oil supply line 42 because the engine has an oil filter (not shown) for the purpose of filtering such particles. Flow meters 67 and 68 and pressure gauges 69 and 70 in supply lines 42 and 44 monitor the flow rates and pressures of the fluids. Flow meters 67 and 68 and pressure gauges 69 and 70 provide a visual feedback as to the state of the system. Flow meters 67 and 68 and pressure gauges 69 and 70, if equipped with an output signal, can also be used as an input to controller 38. The feedback of controller 38 can be used to shut down the system if the flow rate or pressure of the fluids is out of specified tolerances. For example, the flow rate decreases and the pressure will increases if heat exchanger 32 forms a blockage.

A modulating control valve 71 and 72 in each circuit controls the flow rate between engine block 12 and heat exchanger 32. Valves 71 and 72 each have an input 81, 82 which receives a control signal from the controller to control the valve opening depending on the temperature of the fluid within the fluid circuit. Preferably, the valve fully opens at 250° F. and fully closes at ambient temperature (75° F.) and between these temperatures the valve functions linearly with temperature. When the valve is fully closed, heat exchanger 32 can be bypassed and the flow returned to engine block 12 through return lines 46 and 48.

Chilled water from chiller 34 also circulates through heat exchanger 32. This circuit includes an air bleed petcock 74 and a strainer 75 which function as in the oil and coolant supply circuits to heat exchanger 32. The chilled water circuit also includes an on/off solenoid 76 and a flow control ball valve 77 both of which regulate the fluid flow to heat exchanger 32.

In operation, the apparatus is connected to the vehicle and the vehicle components after have reached a first temperature. Air diffuser 50 is also placed under the vehicle. The engine oil and engine coolant are circulated through the heat exchanger until they reach ambient temperature. Air continues to be blown at the exterior of the components until they reach a desired temperature. The apparatus can be set up to shut off automatically when the vehicle components reach the desired temperature for unmanned operation. This can take nearly 45 minutes. Alternatively, the apparatus of the present invention can automatically shut down the system after a fixed period of time, such as 45 minutes especially if the cooling characteristics are known. After the forced cool down is complete, it is desirable to ensure that the vehicle is stabilized at ambient temperature for approximately 15 minutes before another exhaust gas emission test is performed. These times can be varied somewhat, but the most repeatable results occur during exhaust emission tests using these times.

Figure 3:
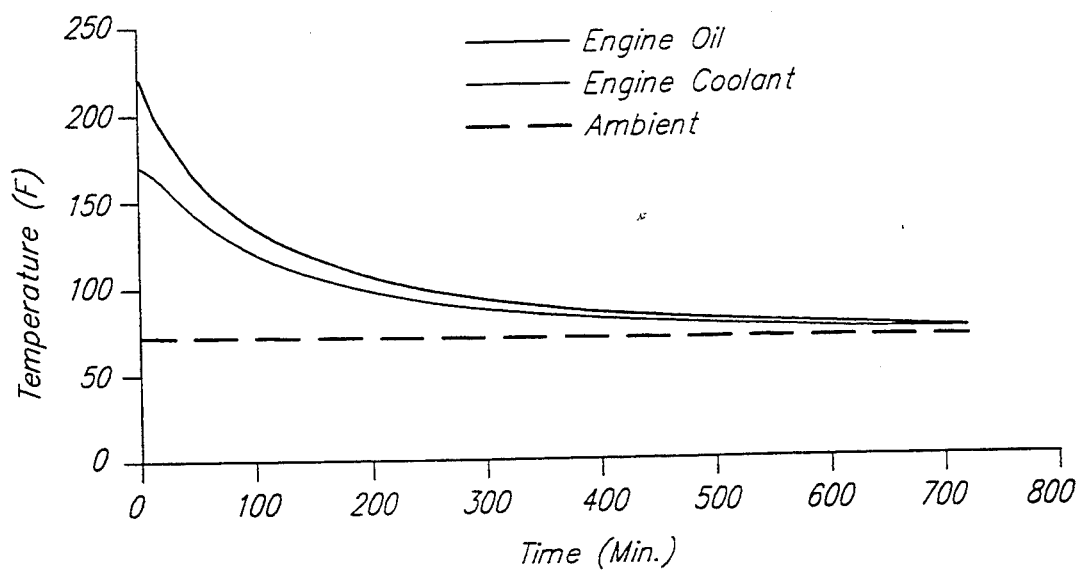
FIGS. 3, 4, 5 and 6 are plots of temperature versus time for several components.
Figure 4:
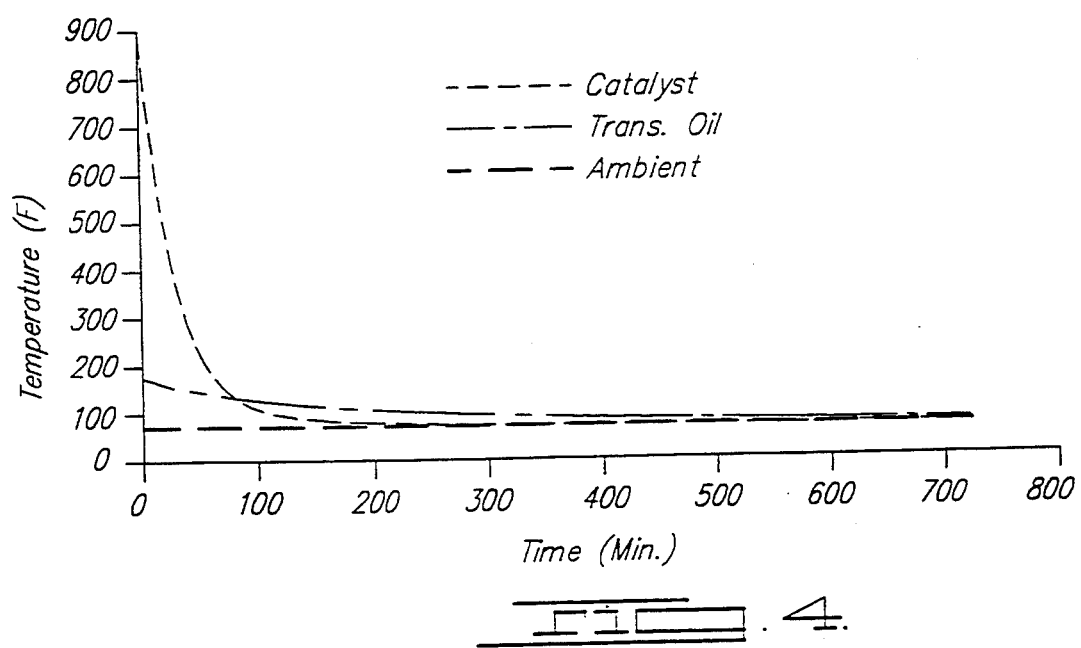

FIGS. 3 and 4 are plots of the temperatures (in ° F.) of various portions of a previously running vehicle undergoing a normal 12 hour cool down in an ambient temperature environment. As can be seen, the temperatures stabilize in about 12 hours. A plot of the engine oil and engine coolant is shown in FIG. 3. FIG. 4 is a plot of the temperatures of the exhaust system at the catalyst and the transmission oil.

Figure 5:
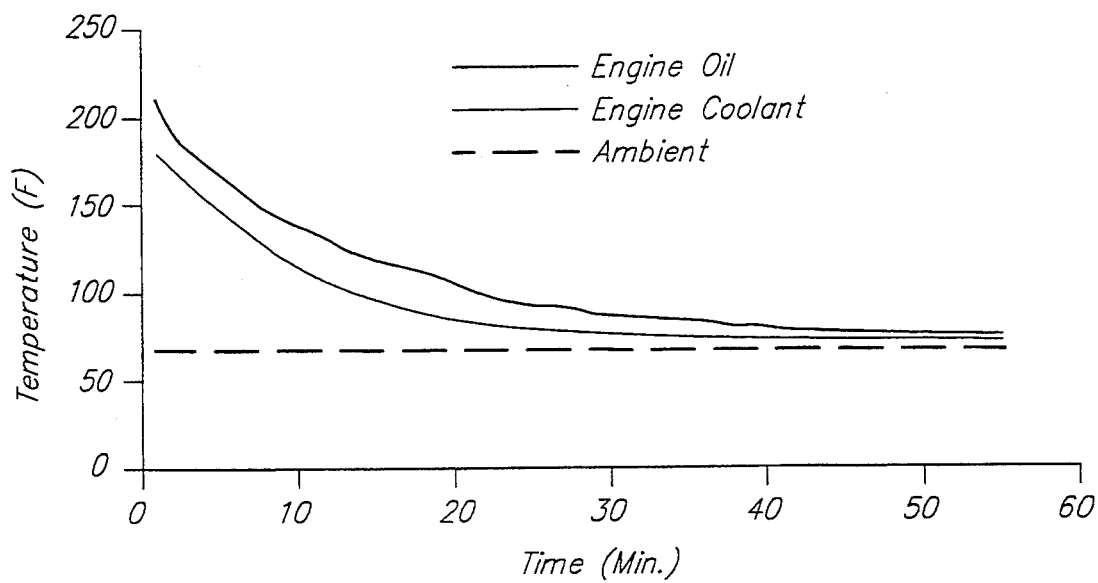
Figure 6:
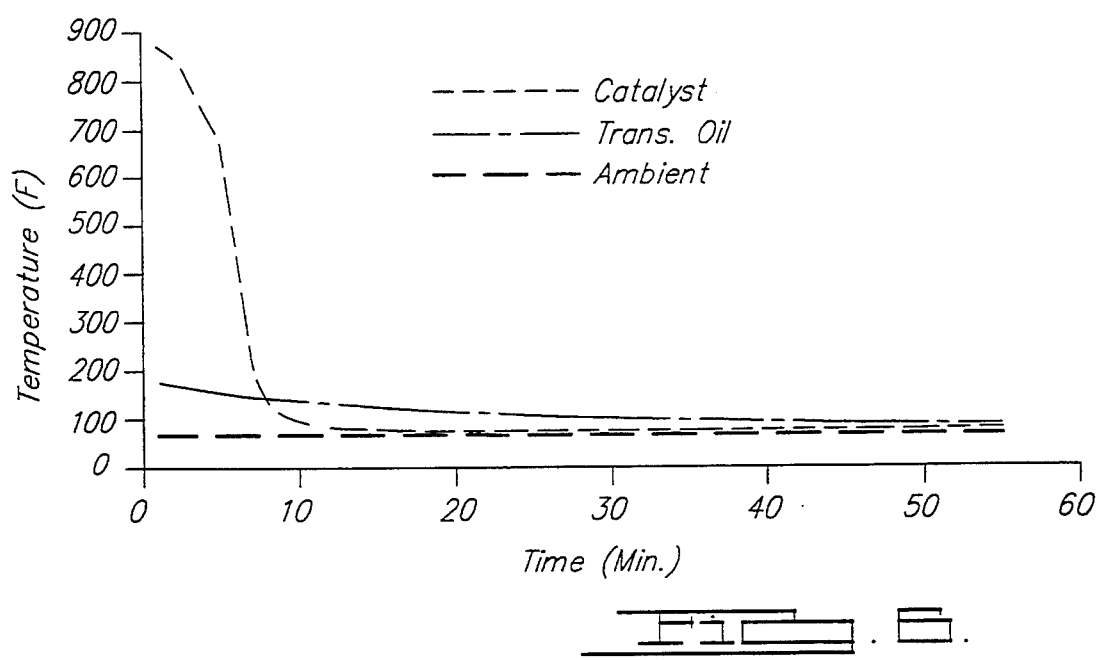

FIGS. 5 and 6 are plots of the temperatures of various components of a previously running vehicle undergoing forced cool down with the apparatus of the present invention. FIG. 5 is a plot of the temperatures of the engine oil and engine coolant. FIG. 6 is a plot of the temperatures of the exhaust system at the catalyst and the transmission oil. As can be seen by comparing FIGS. 3 and 4, the same emission results are achieved in less than an hour with the present invention than that which formerly took 12 hours. As a result, tests can be performed on the vehicle in significantly less time resulting in a faster development time for a vehicle.

Various alterations and modifications of the present invention will no doubt occur to those skilled in the art. For example, a method of circulating the transmission oil could also be provided. It is the following claims, including all equivalents, which define the scope of my invention.

What is claimed is:

1. An apparatus for cooling selected components of a vehicle including an engine from a first temperature to a second temperature, said vehicle including engine oil and engine coolant operatively associated therewith, said apparatus comprising:

a heat exchanger separate from said engine;

circulating means for circulating said engine oil and engine coolant between said engine and said heat exchanger at a predetermined flow rate;

variable valve means for controlling said flow rate between said engine and heat exchanger;

blower means for forcing and directing air at said components;

feedback means for providing a temperature signal from said engine oil, engine coolant and said components; and control means, connected to said feedback means, for controlling the operation of said blower means and circulation means, said control means connected to said variable valve means, whereby said component is cooled in a controlled manner to a second temperature.

2. An apparatus according to claim 1, wherein said selected components include a transmission and an exhaust system.

3. An apparatus according to claim 1, wherein said circulating means comprises a first circulating means for circulating said engine oil and a second circulating means for circulating said engine coolant.

4. An apparatus according to claims 1, wherein said blower means comprises a diffuser means for directing air in a predetermined direction.

5. An apparatus according to claim 4, wherein said diffuser means is directed at a driveline of said vehicle.

6. An apparatus according to claim 4, wherein said diffuser directed at a fuel tank of said vehicle.

7. An apparatus according to claim 4, wherein an exhaust gas removal system is connected to said exhaust system for drawing ambient air into said engine and through said exhaust system whereby further cooling is provided for the engine and said exhaust system.

8. An apparatus according to claim 1, wherein said variable valve means is operative to be fully opened at 200° F. and closed at ambient 75° F.

* * * * *